Patented June 14, 1938

2,120,814

UNITED STATES PATENT OFFICE 2,120,814

AZO DYESTUFFS

Francis Leslie Rose, Blackley, Manchester, England, assignor to Imperial Chemical Industries Limited, a corporation of Great Britain No Drawing. Application October 28, 1935, Serial No. 47,200. In Great Britain October 30, 1934

8 Claims. (Cl. 260—12)

This invention relates to the manufacture of copper complexes of new mon- and disazo dyestuffs.

British Patent No. 165,083 describes the preparation of soluble cotton substantive azo dyestuffs by treating with copper or a compound thereof, an azo dyestuff produced from 5,5'-dihydroxy-2,2'-dinaphthylamine-7,7'-disulphonic acid and one or more molecules of diazotized 2-amino-benzoic acid or its derivatives, or one molecule of a diazotized 2-amino-benzoic acid and one molecule of another diazo compound. British Patent No. 306,908 describes the preparation of azo dyestuffs from diazotized 2-amino-benzoic acid and derivatives of 5-hydroxy-2-naphthylamine-7-sulphonic acid, and the use of copper complexes thereof in the dyeing of viscose. British Patent No. 315,664 (see also German Patent No. 508,584) describes the manufacture of azo dyestuffs containing copper from derivatives of 5-hydroxy-2-naphthylamine-7-sulphonic acid, and among other compounds, diazotized 2-amino-benzoic acid and its esters. The dyestuffs of the present invention differ from those described in the specifications mentioned in that the diazo compound carries an aroylamino group, and to the presence of that aroylamino group the improved affinity for the fibre is to be ascribed.

According to the present invention I manufacture copper complexes of new substantive dyestuffs by coupling completely 2-amino-5-naphthol-7-sulphonic acid or an N-substituted derivative thereof in alkaline medium with a diazotized 2-amino-5-aroylaminobenzoic acid or alternatively, where the coupling component contains two residues of 2-amino-5-naphthol-7-sulphonic acid, with 1 molecular proportion of 2-amino-5-aroylamino-benzoic acid and 1 molecular proportion of another diazotized o-aminoarylcarboxylic acid or a diazotized o-aminophenol and thereafter treating the resulting azo compounds with a copper salt.

The N-substituted derivatives of 2-amino-5-naphthol-7-sulphonic acid include, for example, 2-benzoylamino-5-naphthol-7-sulphonic acid, 5,5'-dihydroxy-2,2'-dinaphthylamine-7,7'-disulphonic acid and 5,5-dihydroxy-2,2'-dinaphthylurea-7,7'-disulphonic acid. Some of these compounds contain two residues of 2-amino-5-naphthol-7-sulphonic acid, that is, to couple completely in alkaline medium they require two molecular proportions of a diazo compound. In such cases as indicated above, I use as diazo compound either two molecular proportions of a diazotized 2-amino-5-aroylaminobenzoic acid, or one molecular proportion of that diazo compound and one molecular proportion of another diazotized o-aminocarboxylic acid or a diazotized o-aminophenol.

The 2-amino-5-aroylaminobenzoic acids used as diazo components may be prepared by nitrating m-aroylaminobenzoic acids and subsequently reducing the nitro group to an amino group, or by aroylating 3-amino-6-acetylaminobenzoic acid and then removing the acetyl radical from the acetylamino group by hydrolysis with dilute alkali.

The treatment with a copper salt according to the invention may be carried out either in substance or on the fibre. In making the copper complexes in substance it is not generally necessary as hereinafter indicated in the examples, to isolate the azo compounds before treatment with a copper salt. As copper salts for such treatment I may use, for example, copper sulphate, copper acetate or an ammoniacal solution of cupric hydroxide.

The new copper complexes, obtained either in substance or on the fibre, are characterized by their excellent affinity for cellulose fibres on which they give Bordeaux to violet shades of good fastness to light.

The following examples, in which the parts are by weight, illustrate but do not limit the invention.

Example 1

25.6 parts of 2-amino-5-benzoylamino-benzoic acid (M. P. 245–250° C. decomp.) and 6.9 parts of sodium nitrite are dissolved in 500 parts of water and 12.5 parts of aqueous caustic soda (32%). The solution is added with stirring to a mixture of 500 parts of water and 35 parts of hydrochloric acid (36%) at 10° C. The crystalline suspension of the diazo compound is added at 10° C. to a solution of 35.9 parts of 2-(2'-carboxy-phenylamino)-5-naphthol-7-sulphonic acid and 30 parts of calcined sodium carbonate in 500 parts of water. From this liquor (A, see below) after 6 hours the dyestuff is salted out by the addition of common salt, filtered off, and dried. It is represented by the formula:

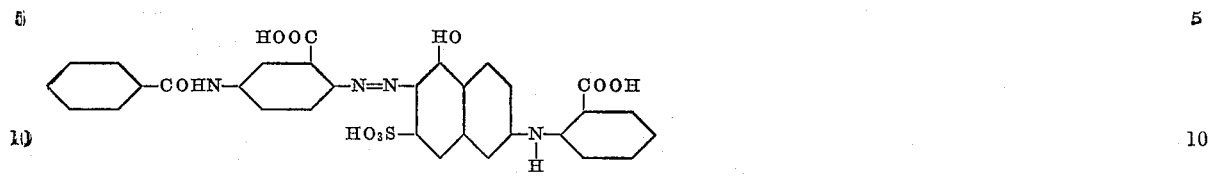

It is a dark colored substance with which cotton is dyed directly from hot or cold dyebaths in a blue-red shade. The affinity is very good. The shade is converted to a red-violet of very good fastness to light on aftertreatment with copper sulphate.

The copper complex may be made in substance as follows:—

The strongly alkaline coupling liquor (A, above) is made neutral to litmus by adding sufficient hydrochloric acid, the dyestuff being thrown out of solution. The suspension is heated to and kept at a temperature of 95° C., a solution of 30 parts of crystallized copper sulphate in 100 parts of water is added, and the liquid is stirred for 3 hours. It is cooled, made alkaline to litmus with sodium carbonate, and the copper complex is salted out and filtered off and dried.

The new copper-containing dyestuff dyes cotton, for which it has excellent affinity, from hot or cold dyebaths in red-violet shades of very good fastness to light.

Example 2

The diazo compound made from 25.6 parts of 2-amino-5-benzoylamino-benzoic acid as described in Example 1, is added to a solution of 35.8 parts of 2-(4'-aminobenzoylamino)-5-naphthol-7-sulphonic acid and 25 parts of calcined sodium carbonate in 500 parts of water at 10° C. After stirring for 6 hours, the liquid is neutralized as described in Example 1, and is heated for 3 hours at 95° C. with a solution of 30 parts of crystallized copper sulphate in 100 parts of water. The suspension is cooled, made alkaline to litmus paper with sodium carbonate, and the copper complex is salted out, filtered off and dried. It is represented by the formula:

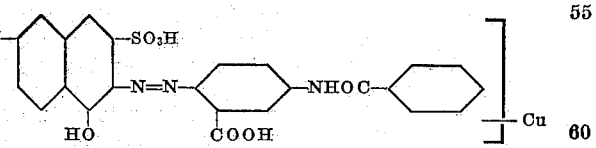

It dyes cotton directly in Bordeaux shades of very good fastness to light.

Example 3

A solution of 21.7 parts of 2-amino-5-sulphobenzoic acid in 300 parts of water and 20 parts of hydrochloric acid (36%) is diazotized with a solution of 6.9 parts of sodium nitrite in 50 parts of water. The diazo solution is added during 30 minutes, with stirring, to a solution of 50.5 parts of the disodium salt of 5,5'-dihydroxy-2,2'-dinaphthylamine-7,7'-disulphonic acid and 30 parts of sodium bicarbonate in 300 parts of water, at 10° C., 30 parts of calcined sodium carbonate are added and the liquid is stirred for 3 hours. A solution of the diazo compound obtained from 25.6 parts of 2-amino-5-benzoylamino-benzoic acid as described in Example 1, is added, and stirring is continued for 18 hours. The solution is made neutral to litmus paper by adding a sufficiency of hydrochloric acid (36%) a solution of 55 parts of crystallized copper sulphate in 200 parts of water is added and the mixture is heated at 95° C. for 3 hours. The liquid is cooled, and made alkaline to litmus paper by adding sodium carbonate. The copper-containing dyestuff is salted out, filtered off and dried. It is represented by the formula:

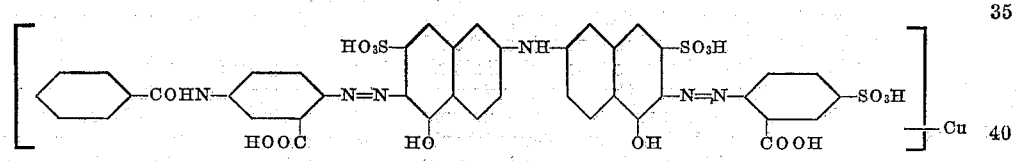

This new dyestuff dyes cotton directly in blue-violet shades of very good fastness to light.

Example 4

If in Example 3, there is used in place of the disodium salt of 5,5'-dihydroxy-2,2'-dinaphthylamine-7,7'-disulphonic acid, 54.8 parts of the disodium salt of 5,5-dihydroxy-2,2'-dinaphthylurea-7,7'-disulphonic acid, a dyestuff is obtained which dyes cotton directly in Bordeaux shades of very good fastness to light and washing. It is represented by the formula:

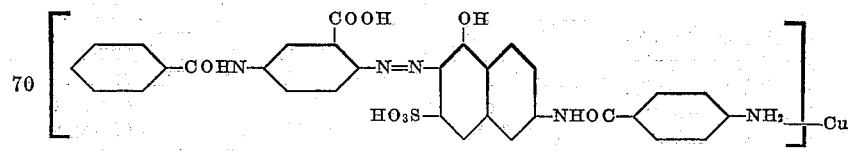

Example 5

If in Example 3, there is used in place of the diazo compound of 2-amino-5-sulpho-benzoic acid the diazo compound from 15.3 parts of 4-nitro-2-aminophenol, a copper-containing dyestuff is obtained which dyes cotton in red-blue shades of very good fastness to light. It is represented by the formula:

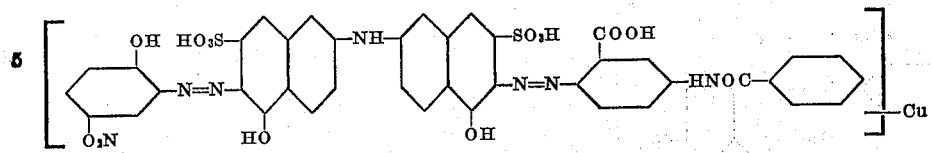

Further examples of dyestuffs made by the process of the present invention are given in the following table:—

| Example | Diazo component | Coupling component | Shade of copper complex on cotton |
|---|---|---|---|
| 6 | 2-amino-5 (4'-toluylamino)-benzoic acid (M. P. 244-245° C. decomp.). | 2 - amino - 5 - naphthol - 7 - sulphonic acid. | Bluish-red. |
| 7 | 2 - amino - 5 - (2' - chlorobenzoylamino) - benzoic acid (M. P. 190-195° C. decomp.). | 2 - (2' - carboxyphenylamino) - 5 - naphthol-7-sulphonic acid. | Red-violet. |
| 8 | 2 - amino - 5 - (4' - anisoylamino) - benzoic acid (M. P. 246° C. decomp.). | 2 - N - ethylamino - 5 - naphthol - 7 - sulphonic acid. | Red-violet. |
| 9 | 2-amino-5-benzoylamino-benzoic acid | 2 - (4' - acetaminophenyl - carbamido) - 5 - naphthol - 7 - sulphonic acid. | Red. |

I claim:
1. Process for the manufacture of new substantive dyestuffs which comprises coupling completely a compound of formula

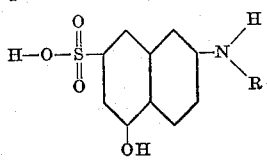

where R represents one of a group consisting of hydrogen, alkyl, aryl, carboxyl-aryl, aroyl, amino-aroyl, and acet-amino-aroyl, with a diazotized 2-amino-5-aroylaminobenzoic acid, and reacting the product with a copper salt.

2. Process for the manufacture of a dyestuff which comprises completely coupling a compound of the formula:

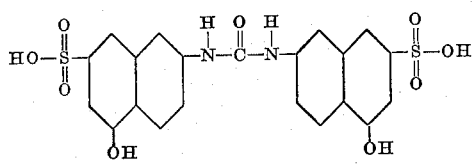

with one mol. of a diazotized 2-amino-5-aroylaminobenzoic acid and one mol. of a diazotized compound represented by the formula:

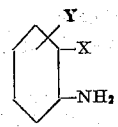

in which X is one of a group consisting of hydroxyl and carboxyl, and Y is one of a group consisting of hydrogen, nitro, and sulfonic acid, and reacting the product with a copper salt.

3. New coppered substantive azo dyes having the formula

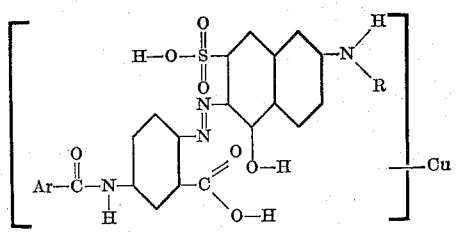

where Ar stands for an aryl radical and R stands for one of a group consisting of hydrogen, alkyl, aryl, carboxy-aryl, aroyl, amino-aroyl, and acet-amino-aroyl.

4. A compound represented by the formula:

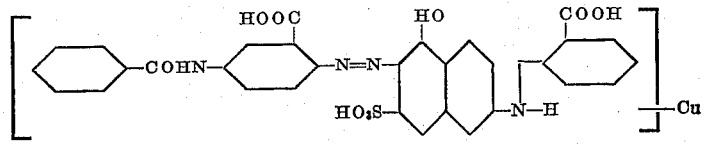

5. A dyestuff represented by the formula:

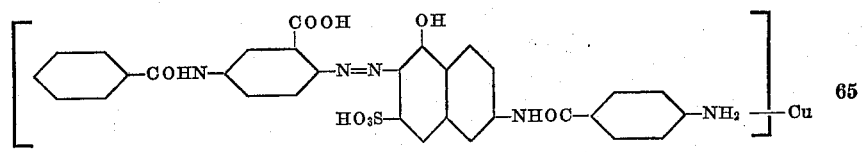

6. A dyestuff represented by the formula:

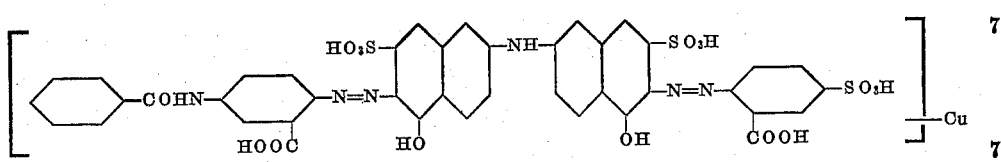

7. A coppered azo dye represented by the formula:

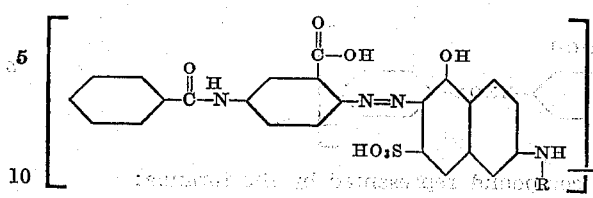

in which R is one of a group consisting of H, alkyl, aryl, carboxyaryl, aroyl, aminoaroyl, and acetaminoaroyl.

8. The copper complexes of the azo dyes made by coupling to a component from the class consisting of 2-amino-5-naphthol-7-sulfonic acid, 2-benzoylamino-5-naphthol-7-sulfonic acid, 5,5'-dihydroxy-2,2'-dinaphthylamine-7,7'-disulfonic acid, 5,5'-dihydroxy-2,2'-dinaphthylurea-7,7'-disulfonic acid, 2-(2'-carboxyphenylamino)-5-naphthol-7-sulfonic acid, 2-(4'-aminobenzoylamino)-5-naphthol-7-sulfonic acid, 2-N-ethyl-amino-5-naphthol-7-sulfonic acid, and 2-(4'-acetaminophenyl-carbamido)-5-naphthol-7-sulfonic acid, diazotized 2-amino-5-aroylaminobenzoic acid and, where the coupling component contains two naphtholsulfonic acid residues, thereafter coupling the so-formed azo compound with one of a group consisting of a diazotized ortho-amino-aryl-carboxylic acid and a diazotized ortho-amino-phenol.

FRANCIS LESLIE ROSE.